W. DOINIKOFF.
ALTERNATING CURRENT COMMUTATOR DYNAMO ELECTRIC MACHINE.
APPLICATION FILED MAR. 6, 1908.

907,578.

Patented Dec. 22, 1908.
8 SHEETS—SHEET 1.

WITNESSES

INVENTOR
ATTORNEYS

W. DOINIKOFF.
ALTERNATING CURRENT COMMUTATOR DYNAMO ELECTRIC MACHINE.
APPLICATION FILED MAR. 6, 1908.

907,578.

Patented Dec. 22, 1908.
8 SHEETS—SHEET 3.

W. DOINIKOFF.
ALTERNATING CURRENT COMMUTATOR DYNAMO ELECTRIC MACHINE.
APPLICATION FILED MAR. 6, 1908.

907,578.

Patented Dec. 22, 1908.
8 SHEETS—SHEET 7.

W. DOINIKOFF.
ALTERNATING CURRENT COMMUTATOR DYNAMO ELECTRIC MACHINE.
APPLICATION FILED MAR. 6, 1908.

UNITED STATES PATENT OFFICE.

WLADIMIR DOINIKOFF, OF KARLSRUHE, GERMANY.

ALTERNATING-CURRENT COMMUTATOR DYNAMO-ELECTRIC MACHINE.

No. 907,578.

Specification of Letters Patent.

Patented Dec. 22, 1908.

Application filed March 6, 1908. Serial No. 419,537.

*To all whom it may concern:*

Be it known that I, WLADIMIR DOINIKOFF, engineer, a subject of the Russian Emperor, residing at Karlsruhe, 74 Kaiserstrasse, Germany, have invented certain new and useful Improvements in Alternating-Current Commutator Dynamo-Electric Machines; and I do hereby declare the following to be a full, clear, and exact description of the invention, such as will enable others skilled in the art to which it appertains to make and use the same.

This invention relates to a device for suppressing sparking in alternating current dynamo electric machines which operate with a commutator and is applicable both to single-phase machines and to polyphase machines.

It has not been possible by means of the devices hitherto known to suppress to a sufficient or satisfactory extent the short circuit currents in the coils undergoing commutation and consequent sparking at the brushes.

Attempts have been made, by means of so-called reversing poles, so to modify the commutator potential curve in single phase commutator machines having two brushes that the part of the curve corresponding with the position of commutation is flattened so that the potential difference between the leading and rear edges of the brush is decreased as much as possible. These reversing poles have been arranged in part so that they act upon the armature winding itself, and in part so that they act upon an auxiliary armature winding which may be mounted on a separate iron core and is inserted between the armature winding proper and the commutator. All known devices of this kind, however, depend for their action only on dynamic induction, and not upon the pulsation of the magnetic flux, and are consequently dependent upon the number of revolutions of the armature so that while at some speeds the potential curve is sufficiently flattened or more than sufficiently flattened, at other speeds it is not so and consequently sparking still occurs.

The device according to the present invention does not depend for its action exclusively on the electro-dynamic induction, but, on the contrary, principally on the induction due to pulsation of the magnetic flux.

According to the invention there are provided an auxiliary armature inserted between the principal armature and the commutator, and a system of commutating poles which act upon this auxiliary armature. Whereas, however, the windings of such poles have been hitherto always inserted in the principal armature circuit, according to the present invention the windings of the commutating field are introduced between points of the principal armature winding on a line approximately at right angles to a diameter drawn through the connecting point of the corresponding brush.

In the accompanying drawings, Figs. 12, 13, 15 and 16 represent corresponding different distributions of the auxiliary armature iron and of commutating poles. Fig. 17 is a single-phase commutator motor having three brushes provided with the device according to the invention.

Figures 4, 5:
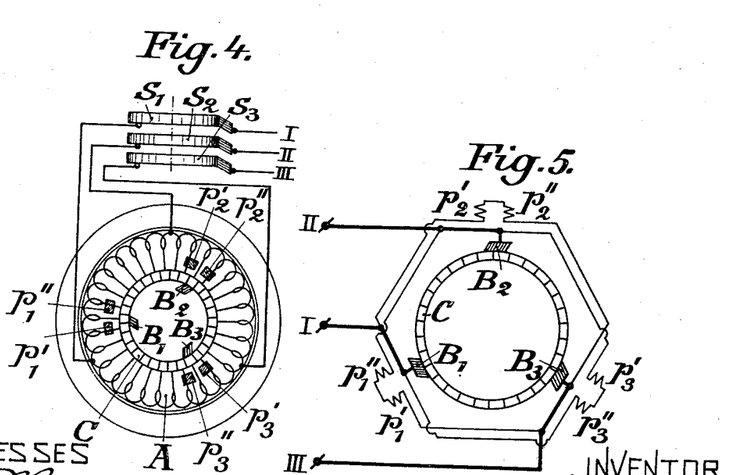
Figs. 4 and 5 are diagrams representing the connections of a polyphase commutator motor or of a rotating field converter in which the device according to the invention is used.

The rotary converter, or polyphase commutator motor shown in Figs. 4 and 5 is of a type invented by Hutin and Leblanc, and is described, together with its mode of operation, in *Wechselstromtechnik*, edited by E. Arnold, Berlin, 1904. Said machine consists of the principal armature A which may be provided with a closed continuous current winding of any known form, and to which a three-phase current is supplied through the slip rings $S_1$, $S_2$, $S_3$. Bearing on and moving over the commutator C are three brushes $B_1$, $B_2$, $B_3$, from which continuous current can be taken in known manner, since synchronism is established between the speed of revolution of the brushes and of the rotary field. For this purpose two brushes suffice, but the device according to the present invention described is only applicable to such machines as are provided with at least three brushes. The three-phase current led, by means of the slip rings $S_1$, $S_2$, $S_3$, into the main armature winding A provides a rotating field, the fundamental wave of which is a sine wave (see Arnold's *Wechselstromtechnik*, Vol. III, pages 295, 300 *et seq.* in which will also be found a discussion of the harmonic waves) and the commutator potential curve will, in this case, also be a periodic curve, the first harmonic of which is also a sine wave. This said potential curve rotates at the same speed as the rotating field, viz. synchronously therewith, and if the armature itself rotates in an opposite direction to the rotation of the commutator potential curve the said curve will stand still in space and not rotate relatively to the brushes. Under these conditions the brushes maintain constant potentials, wherefore it is possible in such a machine to take continuous current from the brushes. It is also possible to obtain the same effect by making the armature stationary and causing the brushes to rotate in the direction of rotation of the commutator potential curve and in this latter case the commutating poles, hereinafter described should rotate with the same speed as the brushes. (In connection with this type of machine, see *The Transactions of the International Electrical Congress of St. Louis, 1904*, article by E. Arnold and J. L. la Cour, "The Commutation of Direct and Alternating Currents)".

If the brushes of the machine illustrated in Fig. 4, move with reference to the commutator potential curve, an alternating current of generally lower frequency will be delivered by the machine and the latter becomes, in this case, a frequency converter. The speed of rotation relatively to the brushes will vary with the slip of the armature, and the frequency of the current thus converted will be equal to the slip frequency. As will be apparent, in this case, the commutator potential curve rotates with a speed relatively different from that of the brushes.

Figure 1:
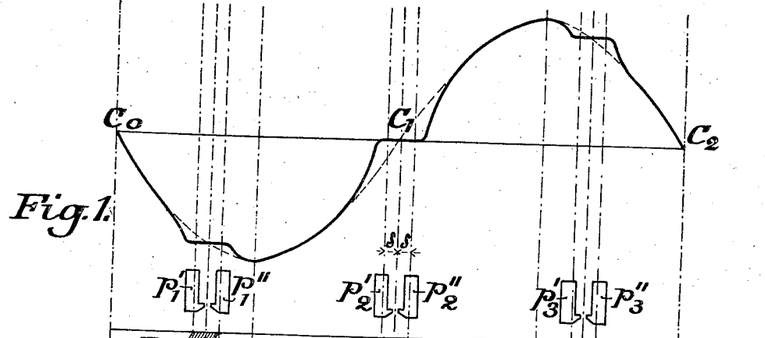
Figures 1, 2 and 3 are graphic representations of the correction of the commutator potential curve which this invention seeks to achieve.

The dotted sine curve $C_0$, $C_1$, $C_2$ in Fig. 1 is a development of the fundamental wave of the commutator potential curve. In proper angular relation with the curve are arranged the three brushes $B_1$, $B_2$, $B_3$, at equal distances of 120° from each other, and over the points of the brushes are the commutating poles $p'_1$, $p''_1$, $p'_2$, $p''_2$, and $p'_3$, $p''_3$.

In Fig. 4 the commutating poles are indicated by hatched rectangles and are indicated by the same reference letters as are used in the preceding paragraph. Since the connecting wires between the principal armature winding A and the commutator C pass in front of these commutator poles, electromotive forces are induced in said wires, the direction of which is determined by the excitation for the time being of the commutating pole, and these electromotive forces are added to the electro-motive forces of the corresponding parts of the armature. The form of the commutator potential curve is thereby varied at the several portions affected, and if it is desired to prevent the establishment of a short circuit current between the two edges of each brush, which current would give rise to sparking, this deformation of the commutator potential curve must be so controlled that it becomes as shown in Fig. 1 a local flattening of the curve extending on each side somewhat beyond the edges of the brushes. These flattenings are shown in Fig. 1 in the curve $C^0$, $C_1$, $C_2$, and the difference between the ordinates of the normal potential curve shown in dotted lines and the deformed curve shown in full lines is a measure of the E. M. F. which must be induced with aid of the commutating poles $p'$, $p''$ in the connecting wires between the armature winding and the commutator in order to effect the desired flattenings. These commutating electromotive forces are shown carried over upon another abscissæ axis in Fig. 2 and appear here as small portions of waves which for neighboring poles $p'$, $p''$ have opposite signs for the periods of time shown. Only at the period of time, at which the axis of the brush passes through the summit of the commutator potential curve, have both the commutating electromotive forces the same sign. If in like manner the corresponding wave portions for all the periods of time are indicated on the abscissæ axis of Fig. 2 and represent the additional electromotive forces in the corresponding times and all the summits of these wave portions are connected by an enveloping curve, there are obtained the two curves shown in dotted lines in Fig. 2.

Figure 3:
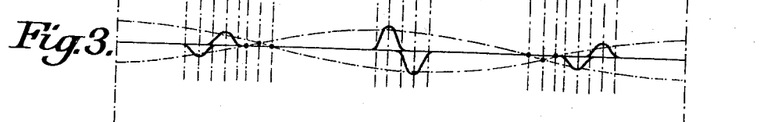

The theoretical discussion of the foregoing shows that these enveloping curves for a sine-shaped commutator potential curve are also sine curves which, however, are displaced with respect to the commutator potential curve one in leading or forward direction and one in lagging or rearward direction. The excitations of the commutating poles must therefore vary approximately in accordance with such an enveloping curve, if they are to induce in the connecting wires between the armature winding and the commutator such commutating electromotive forces that the portion of the commutator potential curve, lying between the leading and rear edges of the brushes, is flattened, and in order to obtain this excitation of the commutating poles they are according to the invention connected in parallel to the armature brushes and therefore also to the armature winding, as is shown in Fig. 5. In the application of the connections shown in Fig. 5 there is involved, however, a small error, since the enveloping curves are not displaced relatively to the commutator potential curve exactly through 90°, but through an angle the size of which is 90° plus or minus $\delta°$, as is shown in Fig. 3.

Figures 6, 7, 8, 9:
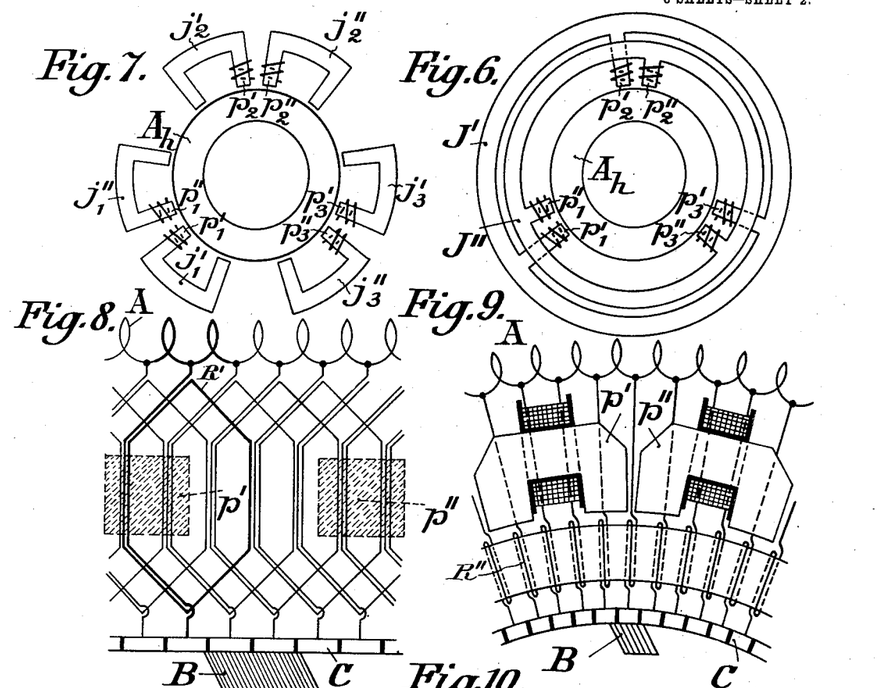
Figs. 6 and 7 are diagrams representing corresponding different distributions and arrangements of the iron in the auxiliary armature and in the commutating poles.
Figs. 8 and 9 are diagrams representing different types of the auxiliary armature winding.
Figures 6, 7:
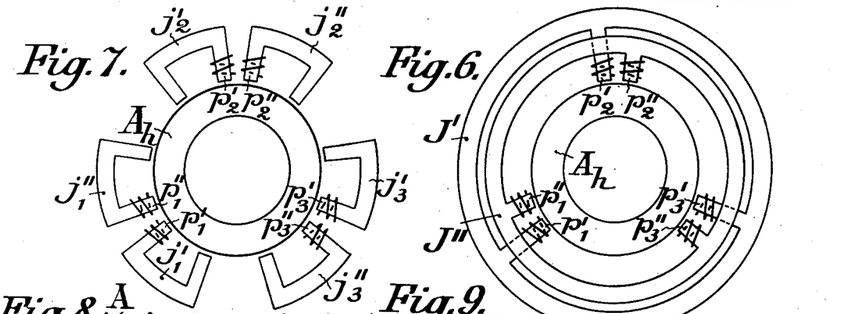
Figures 8, 9:
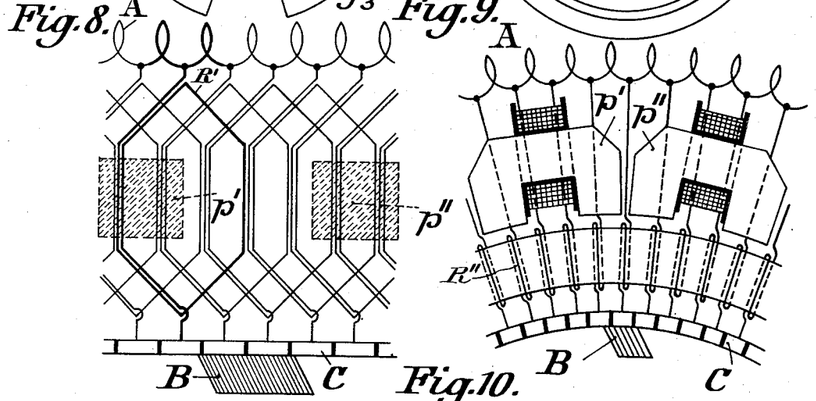

In order to arrive at as complete a utilization as possible of the currents exciting the commutating poles it is essential that the magnetic flux developed in them should as far as possible traverse a closed iron circuit, and for this purpose each of the corresponding pole systems is provided with its own yoke, and the active pole surfaces turned towards the connecting wires between the armature and the commutator are closed by a separate auxiliary armature iron core which may be keyed on the shaft between the principal armature and the commutator and may rotate with the armature. For this system of commutating poles therefore the arrangement may be as shown in Fig. 6. The poles $p'$ are closed externally by the yoke $J'$ and the poles $p''$ by the yoke $J''$, and internally all the poles are closed by the auxiliary armature iron $A_h$.

In Fig. 7 is shown an arrangement of the commutating iron which yields the same working conditions, but is essentially more simple to construct. In this case a substantially closed iron circuit for each separate pole is provided through the auxiliary armature $A_h$ and a separate yoke $j'_1, j''_1$. In this construction there is for each active pole an additional pole which obviously will act on the connecting wire opposite to it like the main pole. As, however, the corresponding commutator segments are not short circuited by the brushes, the local deformation of the commutator potential curve thus produced has no practical effect.

In Figs. 8 and 9 A is the winding of the principal armature, C the commutator, B the brush, and $p'$ and $p''$ are the commutating poles. The two figures show different forms of the auxiliary armature winding, that in Fig. 8 being a drum winding $R'$ and that in Fig. 9 a ring winding $R''$.

Figure 2:
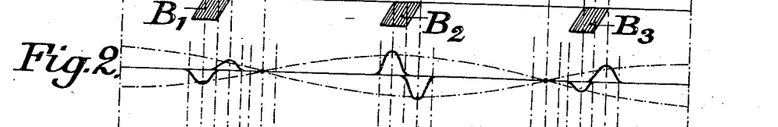
Figure 10:
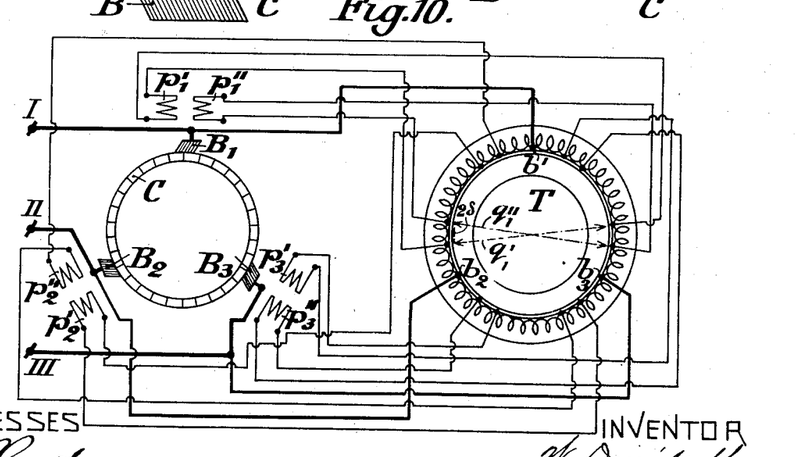
Fig. 10 shows the complete connections of a polyphase commutator motor provided with a device according to the invention.

If the error indicated in Fig. 3 is to be avoided, and if it is desired to obtain the theoretically correct position of the two enveloping curves as they are shown in Fig. 2, the connecting points for the windings of the two commutating poles must be situated at the ends of a diameter or of a chord which is turned relatively to the point of contact of the corresponding brush through an angle of 90° plus or minus $\delta°$, and therefore approximately through an angle of 90° relatively to the respective commutating pole. Such a branching cannot be effected at the commutator itself. It may, however, be arrived at if the connection is adopted which is shown in Fig. 10, in which is shown a polyphase series or a synchronous motor in which the commutator potential curve rotates relatively to the brushes with constant speed, equal to the synchronous speed of rotation of the field. This speed is equal to $\omega = {}_2\pi C$ where C is the frequency of the polyphase current. This frequency accords with that of the current applied at the brushes which are connected with the stator winding of the machine. In this figure the left-hand part of the connection is a repetition of that in Fig. 5. Instead, however, of connecting the windings of the three commutating pairs of poles $p'$, $p''$ directly to the brushes there is inserted between the brushes and the commutating poles a transformer T shown at the right hand side of the figure. This transformer has a ring or drum iron core provided with a closed continuous current winding of known form. The three brushes are connected in parallel with this winding at three symmetrically distributed points $b_1, b_2, b_3$; it follows that a rotary field is excited in the iron of the transformer which rotates synchronously with the main field of the machine. The connecting points of the windings of poles $p'_1, p''_1$ are rendered prominent by dotting in the transformer the diameters upon whose ends they are situated and are indicated by the reference letters $q'_1, q''_1$. The connecting points of the windings of the remaining commutating poles are also indicated, but they are not made separately prominent because the diagram would then be too confused. From this diagram it will be seen that the connecting points for the windings of the respective commutating poles are situated at the ends of a diameter which is turned relatively to the point of contact of the corresponding brush through an angle of 90° plus or minus $\delta°$. For instance, regarding $b'$ as the position of brush $B_1$, with which said point $b'$ in the winding of the transformer is connected, it will be seen that the wires leading to pole $p'_1$ are connected with the transformer winding at opposite ends of the diameter $q'_1$ and that the ends of said diameter are displaced 90° plus and minus $\delta°$ respectively from point $b'$. Owing to this insertion of the transformer T between the brushes and the commutating poles, the exciting waves or the enveloping curves for both poles of a pair $p'$, $p''$ are displaced relatively to each other exactly through 180° and the two exciting curves are displaced through exactly 90° relatively to the first harmonic of the commutator potential curve, that is to say, the theoretical requirement is fulfilled which can be derived from the local flattening of the commutator potential curve. The first harmonic of the exciting curves for the commutating poles thus obtained are, as already stated, shown dotted in Fig. 2, and the commutating poles excited according to these curves therefore completely suppress the source of sparking if the commutator potential curve consists only of the indicated sine-shaped first harmonic. By this connection moreover there is at the same time a part of the higher harmonics taken into consideration, namely the higher harmonics of the $2\nu-1$ order, $\nu$ being an even whole number. These are the 5th, the 9th, the 13th, and so on, that is to say the 4th higher harmonics upwards from the first harmonic. If, however, in any special case the third and the seventh harmonic is strongly developed, special precautions must be taken for this case in order that the injurious action on the commutation may be suppressed, and this precaution may consist in using various known connections which are suitable for suppressing or enfeebling these harmonics. In the case of the 5th, 9th, 13th, etc. harmonics, their peaks extend in the same direction as the peak of the fundamental and therefore the effect of the commutating poles on these harmonics would be generally similar to that produced with respect to the fundamental. The peaks of the 3rd and 7th harmonics extend in an opposite direction to the peak of the fundamental and it is therefore desirable to suppress these harmonics. It may be effected by a proper distribution of the main armature winding or by giving proper form to the pole shoes, or by judicious distribution of the field winding, more particularly when the winding is on the stator. A discussion of this matter of the harmonics is given in *Wechselstromtechnik* hereinbefore referred to, see page 230 et seq., Vol. VIII, edition of 1904.

Figure 11:
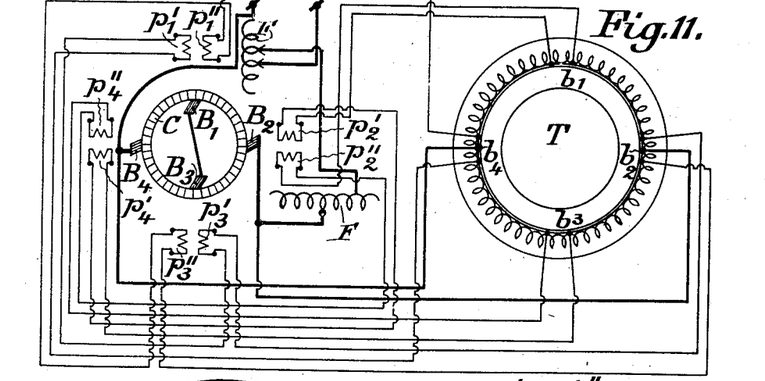
Fig. 11 shows the connections of a single phase motor having four brushes and provided with a device according to the invention.

Figs. 11 17 show the application of the device according to this invention to a selection of known types of single-phase commutator motors.

Figures 12, 13:
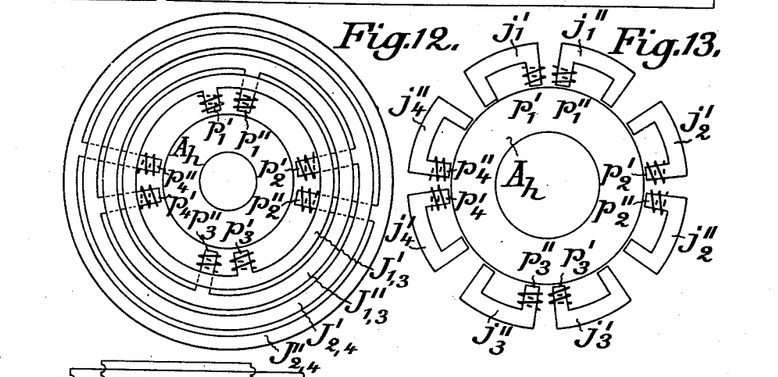
Figure 14:
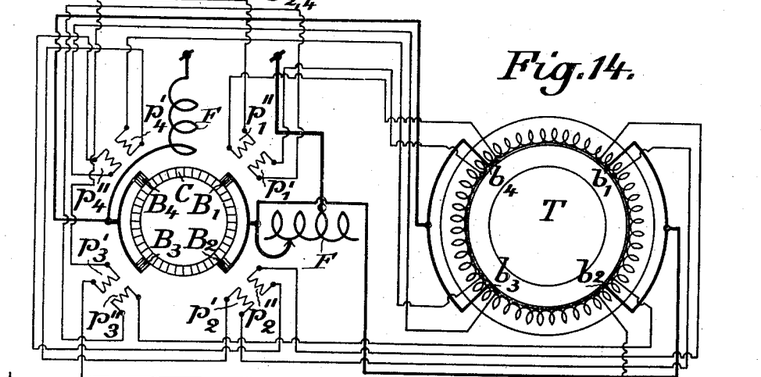
Fig. 14 shows another single-phase commutator motor having four brushes provided with the device according to the invention.

Fig. 11 shows the known connections for a single-phase motor with four brushes, Fig. 14 those of another single-phase motor having four brushes, and Fig. 17 those of a single-phase motor having three brushes. From what has already been said these connections will be clear without further explanation, it being understood that the parts marked F in Figs. 11, 14 and 17 are conventional representations of the field coils. The reference letters indicate parts which are homologous with those indicated by those of like letters in the arrangements already described. The conductors which are branched from the brushes, are connected with the transformer according to the same scheme as that according to which the connection is made between the armature and the brushes, so that in the transformer winding there is produced a reproduction of the commutator potential curve. When four brushes are used instead of three, there are correspondingly provided four pairs of commutating poles $p'$ $p''$ and these are connected with the transformer winding according to the rule given. For the motor in Fig. 11 therefore there is used for the commutating field and the armature iron the arrangement shown in its clearest theoretical form in Fig. 12, the simplest practical form being that indicated in Fig. 13. For the motor shown in Fig. 14 the commutating iron may be as represented in Figs. 13, 15 or 16. For the three brush motor there may be used for the commutating iron the same arrangement as for the three-phase commutator motor shown in Fig. 10, this arrangement being indicated in Figs. 6 and 7. In order in this case to achieve the best possible utilization of the transformer, some points of the winding which have equal potentials are connected with each other, as shown in Fig. 17.

According to the theoretically simplest arrangement of Figs. 6 and 15, the iron of the commutating poles constitutes in connection with the iron of the auxiliary armature a closed magnetic circuit or several such circuits. When in these circuits a flux is created, this may happen not merely owing to the excitation of the windings which are mounted on the pole cores themselves, but by windings which may be arranged in any desired part of the magnetic circuit which is formed by the commutating poles with their yoke and the auxiliary armature iron.

Figure 18:
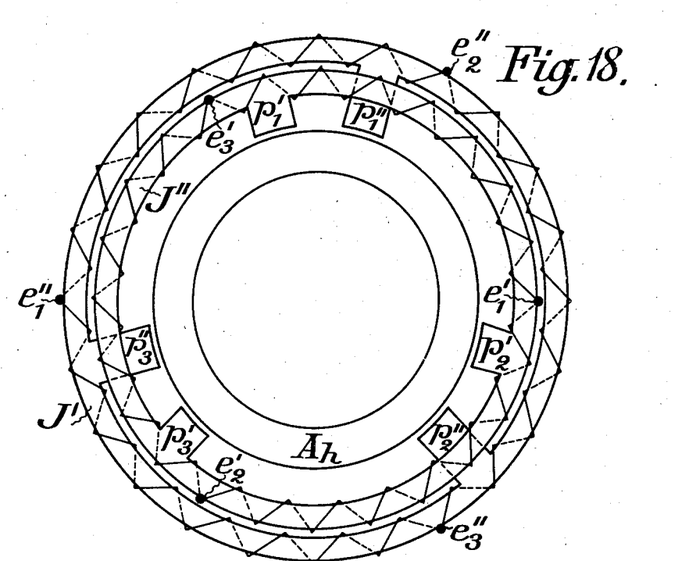
Figs. 18 and 19 show the distribution of the iron of the system of commutating poles represented in Fig. 6, with an exciting winding distributed upon the yokes of the commutating poles and upon the auxiliary armature respectively.
Figure 19:
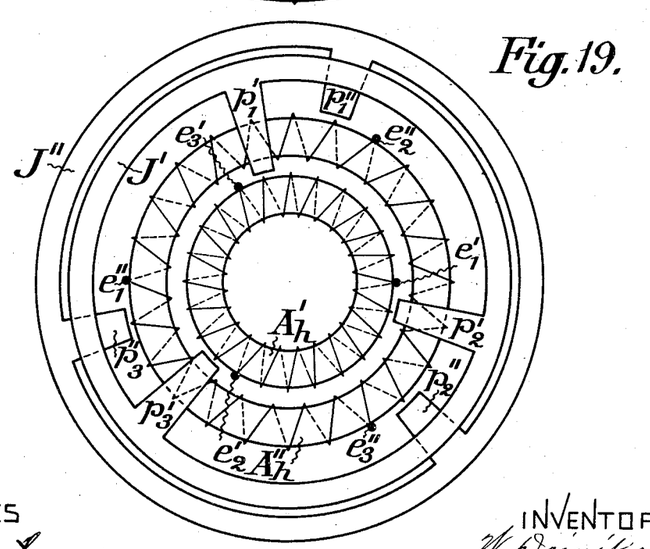
Figure 20:
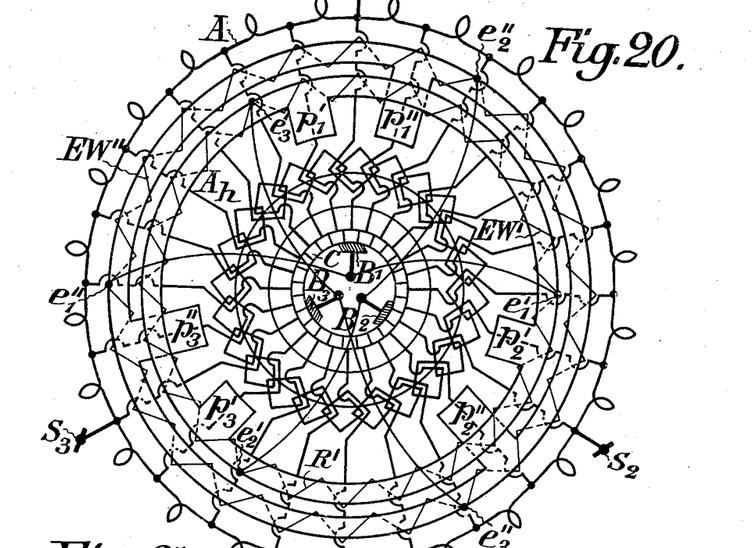
Fig. 20 shows the detailed connections for Fig. 18.
Figure 22:
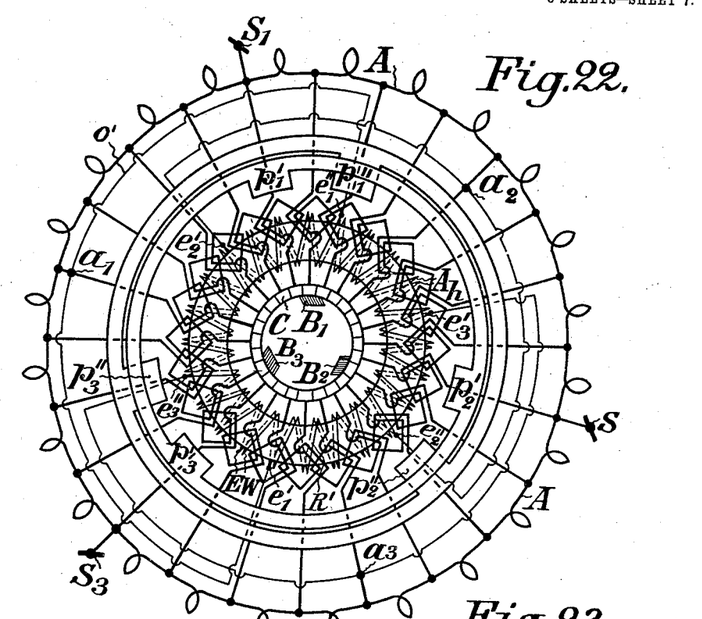
Fig. 22 shows the like for Fig. 19.

As shown in Figs. 18 and 20 the exciting windings may be mounted not only on the commutating poles themselves but on the stationary yokes of the commutating poles or upon the rotating auxiliary armature iron, as indicated in Figs. 19 and 22. There are then obtained the arrangements which are shown in Figs. 18 and 19. In Fig. 18, as before, $A_h$ is the auxiliary armature iron, $J'$ and $J''$ are the two yokes, and $p'_1$, $p''_1$, $p'_2$, $p''_2$, and $p'_3$, $p''_3$ are the commutating poles. In Fig. 19 the auxiliary armature iron is distributed throughout the two rings $A'_h$, $A''_h$.

The stationary yokes in Fig. 18 and also the auxiliary armature irons in Fig. 19 are for the sake of clearness shown as rings concentric with each other. In an actual construction these rings would most simply be of the same diameter and arranged side by side in different planes. The auxiliary armatures are, as hereinbefore indicated, preferably located adjacent to and at the end of the principal armature and the circular yokes of the auxiliary poles are of course disposed concentric with and in proper relation to the corresponding auxiliary armature ring. In the Figs. 18 and 19 moreover the connecting points of the exciting windings are indicated and marked with reference letters $e'_1$, $e''_1$, $e'_2$, $e''_2$, $e'_3$, $e''_3$. It will be seen from this arrangement that the position of the connecting points upon the periphery of the winding is wholly free and they may be distributed in respect to the position of the correction poles in such a manner that the correction with aid of the auxiliary transformer is rendered superfluous.

Figure 21:
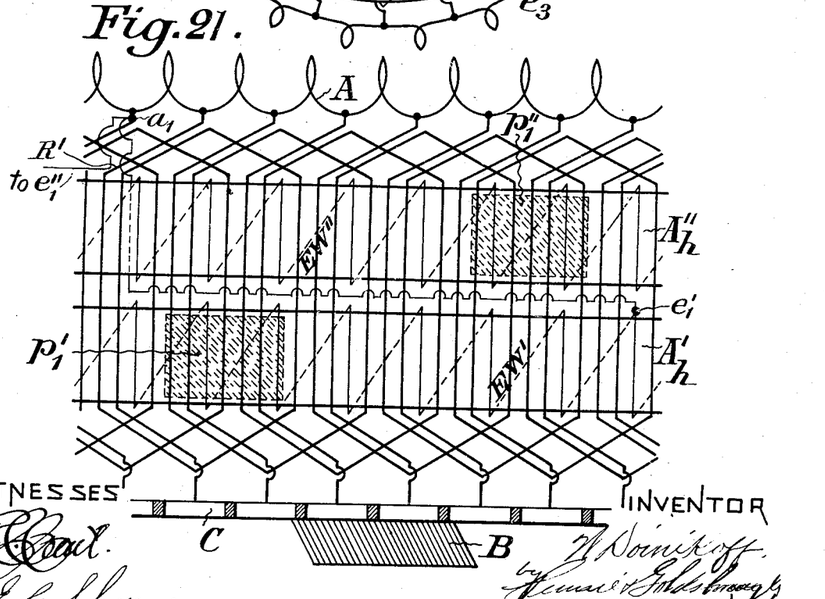
Figs. 21 and 23 represent auxiliary armature windings together with exciting windings of the commutating poles.
Figure 23:
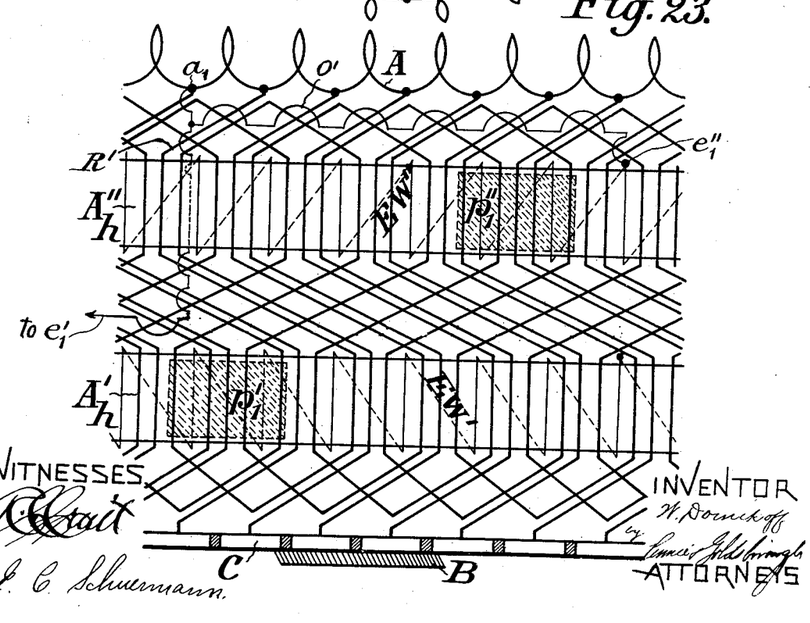

In the following figures of the drawings, a number of examples of this connection has been worked out. Fig. 20 is the diagram of connections in a compensated three-phase asynchronous or series commutator motor, provided with the arrangement of commutating poles and auxiliary armatures indicated in Fig. 18. Figs. 21 and 23 are diagrammatic representations of the auxiliary armature winding, as well as the exciting winding for the case according to Fig. 19. Fig. 22 is the scheme of connections for a three-phase frequency converter which runs with a speed that is far removed from synchronism that is with great slip, in which is employed the particular arrangement of commutating poles and auxiliary armatures hereinbefore described and shown in Fig. 19, it being understood that the auxiliary armatures $A_h'$ and $A_h''$ are arranged parallel to each other and at the end of the main armature, as diagrammatically indicated in Fig. 19.

In the drawings the reference letters have the following meanings:—A is the principal armature winding. $A_h$ is the auxiliary armature, which in some of the modifications described, and as particularly illustrated in Figs. 19, 21 and 23 is divided into two parts $A_h'$ and $A_h''$. E W is the exciting winding of the auxiliary armature, which generally is divided into two exciting windings E W' and E W'' and acts each upon a part of the armature. In Fig. 22 both exciting windings E W' and E W'' for the sake of clearness are shown slightly displaced relatively to each other in order to make the connecting points visible. C is the commutator, $B_1$, $B_2$, $B_3$ the brushes, $p'_1$, $p''_1$, $p'_2$, $p''_2$, $p'_3$, $p''_3$ are the commutating poles, $a_1$, $a_2$, $a_3$ are in Fig. 22 the branching points of the two exciting windings on the main armature winding; in all previous arrangements described these points are constituted by the brushes themselves. $e_1'$, $e_1''$, $e_2'$, $e_2''$, $e_3'$, $e_3''$ are points which indicate the positions of the connecting points of the exciting windings E W' and E W'' with respect to the main armature winding. $S_1$, $S_2$, $S_3$ are the terminals of a polyphase or single-phase network. In the latter case only two are necessary, these being electrically shifted relatively to each other through 180°. The connecting wires R' between the main armature winding and the commutator are disposed as a drum winding with which the two auxiliary armatures $A_h'$ and $A_h''$ are wound in common as indicated in Figs. 20 to 23, inclusive.

Figure 24:
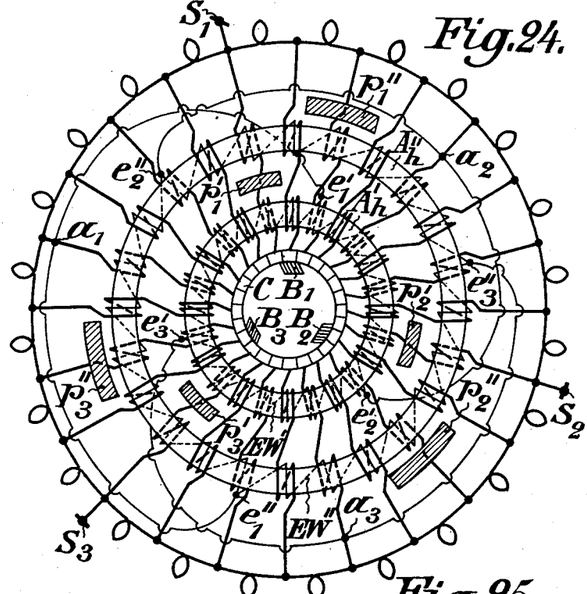
Figs. 24 and 25 are connections with a distribution of the iron according to Fig. 7 applied to a three-phase frequency converter.
Figure 25:
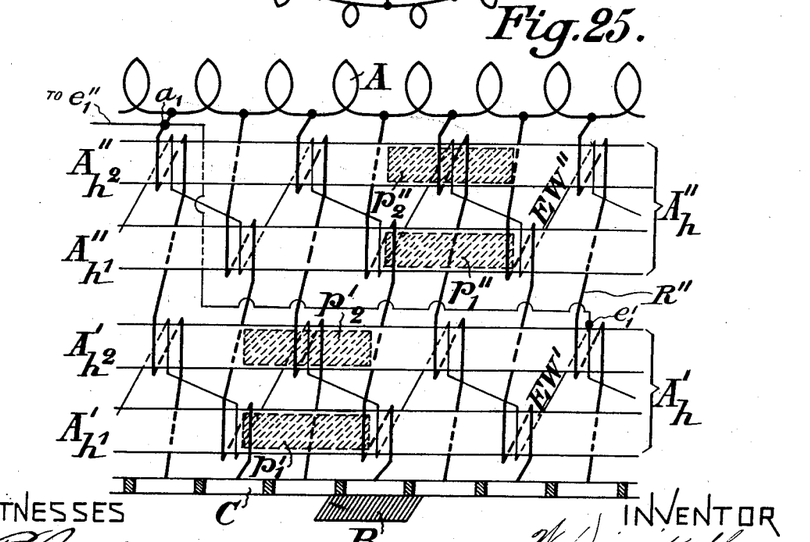

Each armature division is provided with an exciting winding E W', as in Figs. 21 and 23 which may be simply a spiral winding or a spiral wave winding E W' as in Figs. 24 and 25, in which alternate spiral turns are disposed on adjacent auxiliary armatures. In connecting these exciting windings E W' and E W'' with the principal armature winding, for example, from the point $a_1$ of the principal armature winding wires $o$, $o'$ are led to the points $e_1'$, $e_1''$ of the two exciting windings which are respectively forwardly and rearwardly displaced relatively to the point $a_1$ through an angle of 90° in the two pole diagram, see Figs. 22 and 23. The remaining connections are similarly formed. In the case of a single-phase alternating current frequency converter or of an alternating-continuous current converter two brushes in a two pole diagram suffice, and the commutating poles must also be correspondingly arranged over the brushes. In this manner rotating or pulsating magneto-motive force curves are induced in the two auxiliary armatures or yokes, which curves are displaced relatively to each other through 180° in space.

Figs. 24 and 25 show the connection of a frequency converter provided with the device according to the invention, the speed of revolution being any that is desired. The armature parts $A'_h$ and $A''_h$ are each subdivided into parts $A'_{h1}$, $A'_{h2}$, $A''_{h1}$, $A''_{h2}$, as indicated in Fig. 25. The auxiliary armature winding R'' is a spiral wave winding not closed on itself of which the coils are wound alternately according to the series to which they belong upon the two armature parts $A'_{h1}$, $A''_{h1}$, $A'_{h2}$, $A''_{h2}$. The number of the armature divisions may also be increased, in which case the coils of the auxiliary armature winding must be correspondingly distributed.

The exciting windings E W' and E W'' are constructed as closed-coil spiral or progressive helical windings, of which the coils are subdivided to correspond with those of the auxiliary armature winding each upon two or more armature divisions. The connecting points of these windings are arranged relatively to the branching points of the main armature winding as shown in Figs. 21 and 22, that is to say, they are displaced relatively to the said branching points one in forward and one in rearward direction through an angle of 90°. The connections referred to are clearly indicated in Figs. 24 and 25.

By the subdivision of the auxiliary armature winding and the distribution of the separate coils is achieved the result that only one coil of the auxiliary armature winding as well as one of the exciting windings comes simultaneously beneath a commutating pole and thus pulsations of the magnetic flux are almost undamped in the region of the poles.

The commutating poles are constructed according to Fig. 9, but it is no longer necessary to have a gap between each commutating pole and its neighboring pole, and both are brought together, which is permissible as they are not wound. The commutating poles may be subdivided into parts $p'_1$, $p'_2$, $p''_1$, $p''_2$, correspondingly with the the divisions of the armature. In this arrangement the flattening effect of the commutating poles is quite independent of the number of revolutions of the machine. For this reason the arrangement is applicable for frequency converters and various kinds of machines for converting alternating current into continuous current.

In order to avoid an injurious effect of the dynamic induction upon the commutating process in the arrangement according to Figs. 20 and 22, it is necessary that the commutating poles cover a sufficient number of exciting coils suitably separated from each other.

In multipolar machines it is advantageous in all arrangements according to the invention to distribute the commutating poles as uniformly as possible at the periphery of the auxiliary armature.

The auxiliary armature windings shown in Figs. 21, 23 and 25 are applicable without any further alteration save the omission of the exciting windings for machines at whose brushes there is an alternating tension of high periodicity at all loads, that is to say for example for compensated asynchronous machines and single phase commutator motors.

What I claim is:—

1. Mechanism for preventing sparking at the brushes of alternating current commutator dynamo electric machines having a main armature winding, a commutator, and connecting wires between said winding and the commutator; comprising an auxiliary iron core upon which the said connecting wires are wound, commutating poles adapted to influence the said connecting wires in such manner that the commutator potential curve at the places where the brushes are situated is flattened, windings to excite said commutating poles, and an energizing circuit for said pole exciting windings in derivation of the commutator brushes.

2. Mechanism for preventing sparking at the brushes of alternating current commutator dynamo electric machines having a main armature winding, a commutator, and connecting wires between said winding and the commutator; comprising an auxiliary iron core upon which the said connecting wires are wound, commutating poles adapted to influence the said connecting wires in such manner that the commutator potential curve at the places where the brushes are situated is flattened, windings to excite the said commutating poles, and an exciting circuit for said pole exciting windings in derivation of the commutator brushes, the connections of the said windings with the exciting circuit being situated each between two points of the said exciting circuit so selected that they lie in a line approximately at right angles to a diameter through the connecting point of the corresponding brush.

3. Mechanism for preventing sparking at the brushes of alternating current commutator dynamo electric machines, comprising commutating poles, exciting windings for said commutating poles, a transformer, a continuous current winding on said transformer, the said transformer being situated between the brushes and the windings of the commutating poles, connections between the winding of the said transformer and the brushes, and connections between the windings of said transformer and the exciting windings for the commutating poles, the said latter connections lying between the ends of chords which are turned through an angle of 90° increased or diminished to the extent of approximately a segment breadth plus half a brush breadth from the axes of the brushes relatively to the connecting points of the brush connections.

4. Mechanism for preventing sparking at the brushes of alternating current commutator dynamo electric machines having a main armature winding, a commutator, and connecting wires between said windings and the commutator; comprising an auxiliary armature iron core upon which the said connecting wires are wound, commutating poles adapted to influence the said connecting wires in such manner that the commutator potential curve at the places where the brushes are situated is flattened, windings for exciting said commutating poles, an exciting circuit for said pole exciting windings in derivation of the commutator brushes, the connections of the said windings with the exciting circuit being situated each between two points of the exciting circuit so selected that they lie in a line approximately at right angles to the connecting point of the corresponding brush, and means for completing the magnetic circuit of each commutator pole through the auxiliary armature iron.

5. Mechanism for preventing sparking at the brushes of alternating current commutator dynamo electric machines, comprising commutating poles, exciting windings for said commutating poles, a transformer situated between the brushes and the windings of said commutating poles, a continuous current winding on said transformer, connections between the windings of said transformer and the brushes, connections between the windings of said tranformer and the windings of the commutating poles, said latter connections lying between the ends of chords which are turned through an angle of 90° increased or diminished to the extent of approximately half a segment breadth plus half a brush breadth from the axes of the brushes relatively to the connecting points of the brush connections, and means for completing the magnetic circuit of each commutating pole through the auxiliary armature iron.

6. Mechanism for preventing sparking at the brushes of alternating current commutator dynamo electric machines having a main armature, a winding on said armature, a commutator, and wires connecting the said armature winding and the commutator; comprising an auxiliary armature iron core upon which said wires are wound, commutating poles, a yoke for the said commutating poles, a sub-divided winding serving to excite said commutating poles, and an energizing circuit for said sub-divided winding in derivation of the commutator brushes.

In testimony whereof I have affixed my signature, in presence of two witnesses.

WLADIMIR DOINIKOFF.

Witnesses:
RICHARD RISKUER,
JOS. H. LEUTE.